(12) United States Patent
Lopatin et al.

(10) Patent No.: US 12,729,994 B2
(45) Date of Patent: Sep. 8, 2026

(54) VIBRONIC MULTISENSOR

(71) Applicant: Endress+Hauser SE+Co. KG, Maulburg (DE)

(72) Inventors: Sergey Lopatin, Lörrach (DE); Jan Schleiferböck, Rümmingen (DE); Tobias Brengartner, Emmendingen (DE)

(73) Assignee: Endress+Hauser SE+Co. KG, Maulburg (DE)

(*) Notice: Subject to any disclaimer, the term of this patent is extended or adjusted under 35 U.S.C. 154(b) by 273 days.

(21) Appl. No.: 18/695,898

(22) PCT Filed: Sep. 22, 2022

(86) PCT No.: PCT/EP2022/076341
§ 371 (c)(1),
(2) Date: Mar. 27, 2024

(87) PCT Pub. No.: WO2023/057220
PCT Pub. Date: Apr. 13, 2023

(65) Prior Publication Data

US 2024/0385025 A1 Nov. 21, 2024

(30) Foreign Application Priority Data

Oct. 7, 2021 (DE) ..................... 10 2021 126 092.2

(51) Int. Cl.
*G01F 23/22* (2006.01)

(52) U.S. Cl.
CPC .................................. *G01F 23/22* (2013.01)

(58) Field of Classification Search
CPC .............................. G01F 23/22; G01F 23/296
See application file for complete search history.

(56) References Cited

U.S. PATENT DOCUMENTS

| | | | | |
|---|---|---|---|---|
| 5,966,983 | A | 10/1999 | Pfeiffer et al. | |
| 2012/0279283 | A1* | 11/2012 | Brengartner | G01F 23/2967 73/861.351 |
| 2016/0282168 | A1 | 9/2016 | Fehrenbach et al. | |
| 2018/0010322 | A1* | 1/2018 | Grover | G01S 15/88 |
| 2022/0146484 | A1* | 5/2022 | Lopatin | G01N 9/002 |

FOREIGN PATENT DOCUMENTS

| | | | |
|---|---|---|---|
| DE | 10051025 | A1 | 4/2002 |
| DE | 102015112543 | A1 | 2/2017 |
| EP | 2667164 | A | 11/2013 |
| WO | 2020216582 | A1 | 10/2020 |

* cited by examiner

*Primary Examiner* — Tarun Sinha
(74) *Attorney, Agent, or Firm* — Mark A. Logan; Endress+Hauser (USA) Holding, Inc.

(57) ABSTRACT

A method for determining and/or monitoring a predeterminable fill level of a medium in a containment with a sensor having a sensor unit with a mechanically oscillatable unit in the form of an oscillatory fork and at least one piezoelectric element comprises exciting the sensor unit with an excitation signal such that mechanical oscillations are executed, receiving the mechanical oscillations of the sensor unit and converting such into a first received signal, transmitting a transmitted signal from the sensor unit and receiving a second received signal and ascertaining information concerning the predeterminable fill level of medium in the containment based on the first received signal. Information concerning state of the sensor unit is ascertained based on the second received signal.

4 Claims, 4 Drawing Sheets

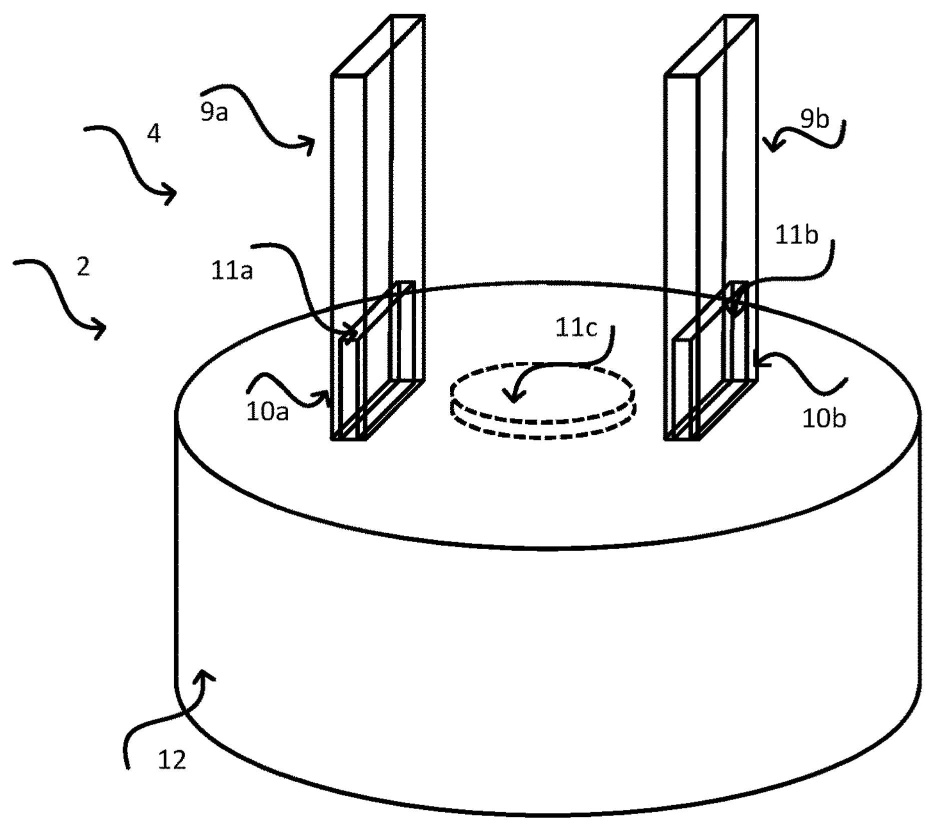
Fig. 2c
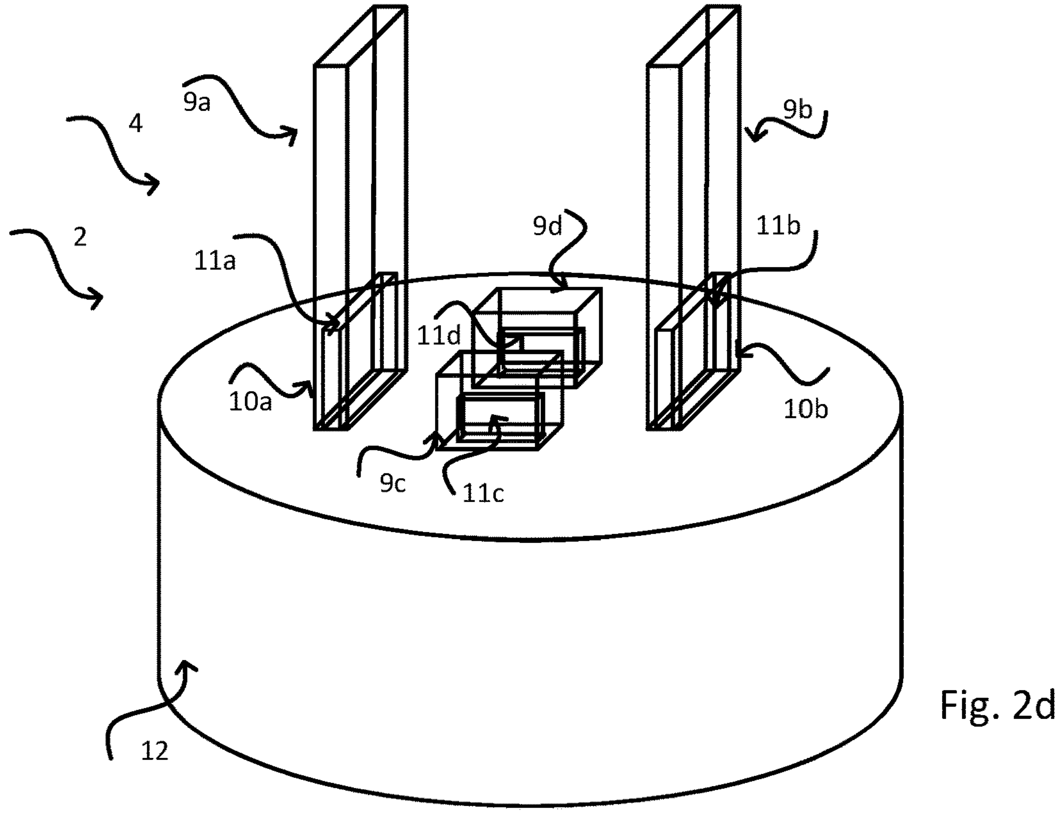
Fig. 2d
Fig. 2

VIBRONIC MULTISENSOR

CROSS-REFERENCE TO RELATED APPLICATIONS

The present application is related to and claims the priority benefit of DPMA Patent Application No. 10 2021 126 092.2, filed on Oct. 7, 2021, and International Patent Application No. PCT/EP2022/076341, filed Sep. 22, 2022, the entire contents of which are incorporated herein by reference.

TECHNICAL FIELD

The invention relates to a method for determining and/or monitoring a predeterminable fill level of a medium in a containment with a sensor comprising a sensor unit having a mechanically oscillatable unit in the form of an oscillatory fork and at least one piezoelectric element. The medium is located in a containment, for example, a container or a pipeline.

BACKGROUND

Vibronic sensors are widely used in process and/or automation technology. In the case of fill level measuring devices, such have at least one mechanically oscillatable unit, such as, for example, an oscillatory fork, a single tine or a diaphragm. Such is excited during operation by means of an exciting/receiving unit, frequently in the form of an electromechanical transducer unit, such that mechanical oscillations are executed. The electromechanical transducer unit can be, for example, a piezoelectric drive or an electromagnetic drive. Corresponding field devices are manufactured by the applicant in great variety and sold, for example, under the LIQUIPHANT and SOLIPHANT marks. The underpinning measuring principles are known, in principle, from a large number of publications. The exciting/receiving unit excites the mechanically oscillatable unit by means of an electrical excitation signal, such that mechanical oscillations are executed. Conversely, the exciting/receiving unit can receive the mechanical oscillations of the mechanically oscillatable unit and convert such into an electrical, received signal. The exciting/receiving unit is either separate exciting and receiving units, or one combined exciting/receiving unit.

In such case, the exciting/receiving unit is in many cases part of a fed back, electrical, oscillatory circuit, by means of which the exciting of the mechanically oscillatable unit occurs, such that mechanical oscillations are executed. For example, for a resonant oscillation, the oscillatory circuit state must be created, in which the amplification factor is $>1$ and all phases arising in the oscillatory circuit sum to a multiple of 360°. For exciting and fulfilling the oscillatory circuit state, a certain phase shift between the excitation signal and the received signal needs to be assured. Therefore, frequently a predeterminable value for the phase shift, thus, a desired value for the phase shift between the excitation signal and the received signal, is set. For this, the state of the art offers the most varied of solutions, including both analog as well as also digital methods, such as described, for example, in DE102006034105A1, DE102007013557A1, DE102005015547A1, DE102009026685A1, DE102009028022A1, DE102010030982A1 and DE00102010030982A1.

Both the excitation signal as well as also the received signal are characterized by a frequency $\omega$, an amplitude A and/or a phase $\Phi$. Correspondingly, changes in these variables are usually taken into consideration for determining the particular process variable. The process variable can be, for example, a fill level, a predetermined fill level, or the density or viscosity of the medium, as well as flow, e.g. flow rate. In the case of a vibronic limit level switch for liquids, for example, it is distinguished, whether the oscillatable unit is covered by the liquid or freely oscillating. These two states, the free state and the covered state, are distinguished, in such case, for example, based on different resonance- or eigen frequencies, thus, based on frequencies in the case of a predetermined phase shift between excitation signal and received signal.

Density and/or viscosity can, in turn, only be ascertained with such a measuring device, when the oscillatable unit is completely covered by the medium. For determining density and/or viscosity, likewise different options are provided by the state of the art, such as those described, for example, in DE10050299A1, DE102007043811A1, DE10057974A1, DE102006033819A1, DE102015102834A1 and DE102016112743A1.

Known from DE102012100728A1 and DE102017130527A1 are, additionally, various vibronic sensors, in the case of which the driving/receiving units in the form of piezoelectric elements are arranged, at least partially, within the oscillatable unit. With such and similar arrangements, advantageously, a plurality of process variables can be determined with a single sensor and used for characterizing different processes, such as described, for example, in WO2020/094266A1, DE102019116150A1, DE102019116151A1, DE02019116152A1, DE102019110821A1, DE102020105214A1 and DE102020116278A1.

In order to determine at least two different process variables by means of such a multisensor, the sensor unit is, on the one hand, excited by means of an excitation signal, such that mechanical oscillations are executed, and the mechanical oscillations of the sensor unit are received and converted into a first received signal. Additionally, a transmitted signal is transmitted from the sensor unit and a second received signal received. Based on the first received signal, then a first process variable can be ascertained, and, based on the second received signal, a second process variable can be ascertained. The piezoelectric element serves in the case of such multisensors as driving/receiving unit and for producing the mechanical oscillations by means of the excitation signal and for producing the transmitted signal.

In the case of application of vibronic sensors with oscillatable units in the form of oscillatory forks for determining and/or monitoring a predeterminable fill level, e.g. a limit level, of a medium in a containment, it must be reliably detected, whether the mechanically oscillatable unit is covered with the respective medium or not. Such is especially important in the case of safety-critical applications, for example, in the case of applications, which require that the utilized measuring device have a certain safety integrity level (SIL). Based on an evaluation of the frequency of the received signal representing the mechanical oscillations of the mechanically oscillatable unit, however, an exact determination concerning the degree of covering, e.g. a complete covering, of the mechanically oscillatable unit is in some cases insufficiently exactly possible. The ascertained covering is influenced, for example, by various measurement parameters, such as the reigning temperatures or the density of the medium.

SUMMARY

Therefore, an object of the invention is to improve the accuracy of measurement of vibronic, limit level sensors.

The object is achieved by a method for determining and/or monitoring at least first and second process variables of a medium in a containment with a sensor having a sensor unit with a mechanically oscillatable unit in the form of an oscillatory fork and at least one piezoelectric element, comprising:

exciting the sensor unit by means of an excitation signal, such that mechanical oscillations are executed, receiving the mechanical oscillations of the sensor unit and converting such into a first received signal, transmitting a transmitted signal from the sensor unit and receiving a second received signal by the sensor unit, and based on the first received signal, ascertaining information concerning a predeterminable fill level of the medium in the containment.

According to the invention, information concerning state of the sensor unit is ascertained based on the second received signal.

By means of the excitation signal, the oscillatable unit produces mechanical oscillations, which are influenced by the properties of the medium, when the oscillatable unit is covered by medium. Correspondingly, based on the first received signal and according to the vibronic measuring principle, information can be ascertained concerning the predeterminable fill level.

The transmitted signal is transmitted and received by a component of the sensor unit, for example, the one or more piezoelectric elements. For example, the transmitted signal propagates along a measurement path extending between the two oscillatory elements of the oscillatable unit embodied in the form of an oscillatory fork, or along a measurement path between one oscillatory element and an additional component of the sensor unit, or between the sensor unit and a wall of the containment. In this way, the transmitted signal passing at least at times and sectionally through the medium is influenced by the physical and/or chemical properties of the medium, especially medium in the region of the sensor unit, and can by means of the ultrasonic measuring principle correspondingly be taken into consideration for determining information concerning state of the sensor unit. For example, the presence of medium in a region between the two oscillatory elements of the oscillatable unit can be detected reliably. Depending on structural embodiment of the sensor unit and the one or more piezoelectric element or elements relative to the oscillatory elements, in given cases, also a degree of covering of the oscillatable unit with the medium can be ascertained. Also the presence of a blockage of the oscillatable unit by a deposit or by a solid body present in the medium can be detected. On the whole, thus, a comprehensive state monitoring of the sensor unit is possible based on an evaluation of the second received signal.

Because two measuring principles are implemented in a single device, the accuracy of measurement relative to the detecting of the predeterminable fill level, thus the limit level detection, can be significantly improved. Based on the second received signal, according to the invention, information concerning state of the sensor unit, especially concerning covering, or degree of covering, of the oscillatable unit with the medium, can be gained. Moreover, it is, additionally, possible, based on the first and second received signals, to ascertain various other process variables of the medium.

In an embodiment of the method, the excitation signal and/or the transmitted signal are/is an electrical signal having at least one predeterminable frequency, especially a sinusoidal, a rectangular, a trapezoidal, a triangular or a sawtooth-shaped signal. For example, the excitation signal can be so selected that the oscillatable unit by means of the excitation signal is excited to execute resonant oscillations.

Also for the transmitted signal, various, different options are possible. Thus, advantageously, the transmitted signal is a pulsed signal, especially a signal having a predeterminable, preferably constant, pulse width.

In an additional embodiment of the method of the invention, the transmitted signal is a signal of variable frequency using frequencies within a predeterminable frequency interval. Preferably within this frequency interval, a so-called frequency sweep is performed, in the case of which the frequency varies successively within the predeterminable frequency interval. Also, a pulsed frequency sweep can serve as transmitted signal.

As already discussed, the information with reference to state of the sensor unit can be, for example, information concerning a covering, especially a degree of covering, of the oscillatable unit with medium. Likewise, deposits in the region of the sensor unit can be detected. Moreover, in an additional embodiment, the information with reference to state of the sensor unit is information concerning a blockage in the region of the sensor unit.

In an advantageous embodiment, an amplitude of the second received signal is ascertained. The information with reference to state of the sensor unit can thus, advantageously, be generated based on an amplitude detection.

In an additional advantageous embodiment of the method of the invention, a frequency of the first received signal is ascertained.

Based on the amplitude and/or frequency of the first and/or second received signal, in especially easy manner, different pieces of information concerning the sensor unit can be derived. In the case of such an evaluation of the received signals, advantageously, no especially high requirements need to be placed on electronic components or evaluation mechanisms. Some especially preferred variants are set forth in the following. It is understood, however, that besides the described embodiments, various other embodiments can be used, which likewise fall within the scope of the invention.

Concerning evaluation of the second received signal as regards amplitude and/or frequency, advantageously, if the frequency of the first received signal exceeds or subceeds a predeterminable frequency limit value, and the amplitude of the second received signal subceeds a predeterminable amplitude limit value, then it is determined that a blockage is present in the region of the sensor unit.

Likewise advantageously, if the predeterminable limit level is a maximum fill level of medium in the containment, and if the amplitude of the second received signal exceeds a predeterminable limit value, then it is determined that the maximum fill level has been reached.

Alternatively, advantageously, if the predeterminable limit level is a minimum fill level of medium in the containment, and if the amplitude of the second received signal subceeds a predeterminable limit value, then it is determined that the minimum fill level has been reached. In the case of a so-called MIN switch, the covered state represents the safe state. For example, in the case of media of high viscosity, it can happen that no reliable information concerning the limit level is possible based on the first received signal. Blockings of the oscillatable unit by the, especially viscous, medium or otherwise by particles present in the medium must in such case be safely excluded, and this is possible by means of the invention.

Finally, another embodiment of the method of the invention includes that the excitation signal and the transmitted signal are periodically, alternately produced. In this way, the state monitoring of the sensor unit can be performed continuously.

Alternatively, advantageously in another embodiment, the transmitted signal is produced at predeterminable, especially periodic, points in time. In such case, the state of the sensor unit is checked as required.

Quite especially advantageous is when the exciting of the mechanically oscillatable unit by means of the excitation signal is interrupted, when the transmitted signal is transmitted and the second received signal received. In this way, the presence of medium between the two oscillatory elements of the oscillatory fork can be ascertained especially reliably.

In the case of the sensor unit in the form of an oscillatory fork with two oscillatory elements and at least one piezoelectric element, wherein the piezoelectric element is arranged, at least partially, within an oscillatory element, such preferably concerns an embodiment of a sensor unit according to DE102012100728A1 and DE102017130527A1. Comprehensive reference is taken to the two applications in the context of the present invention. The embodiments of the sensor unit described in the two documents are, however, only examples of possible structural embodiments of the sensor unit.

BRIEF DESCRIPTION OF THE DRAWINGS

The present disclosure and advantageous embodiments thereof will now be explained in greater detail based on the appended drawing, the figures of which show as follows.

Figure 1:
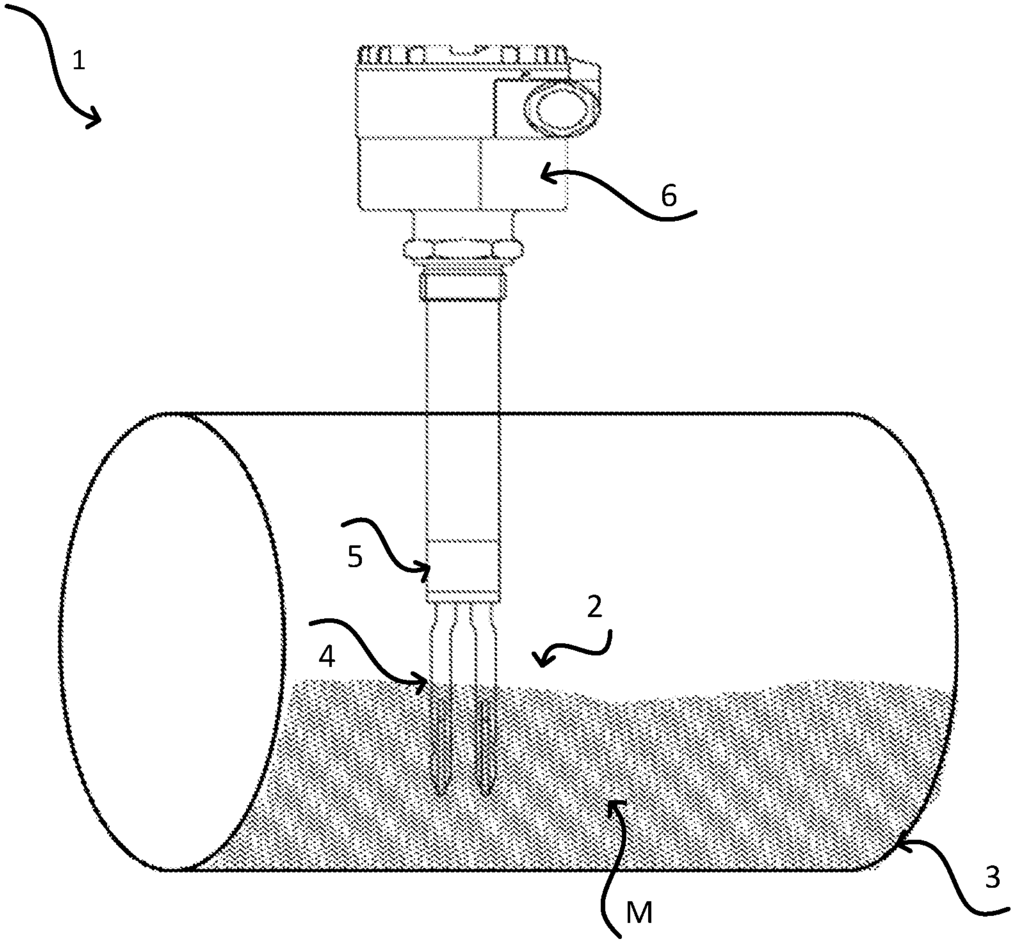
FIG. 1 shows a schematic view of a vibronic sensor according to the state of the art.

In the figures, equal elements are provided with equal reference characters.

DETAILED DESCRIPTION

FIG. 1 shows a vibronic sensor 1 with a sensor unit 2. The sensor includes a mechanically oscillatable unit 4 in the form of an oscillatory fork, which is partially immersed in a medium M located in a container 3. Oscillatable unit 4 is excited by means of the exciting/receiving unit 5, such that the oscillatable unit executes mechanical oscillations. For example, a piezoelectric stack- or bimorph drive can be used. Other vibronic sensors operate, for example, via electromagnetic exciting/receiving units 5. It is possible to use a single exciting/receiving unit 5, which serves for exciting the mechanical oscillations as well as for their detection. Likewise, however, it is also known to implement separate driving and receiving units. FIG. 1 includes, furthermore, an electronics 6, by means of which signal registration, —evaluation and/or—feeding occurs.

Figures 2, 2A, 2B:
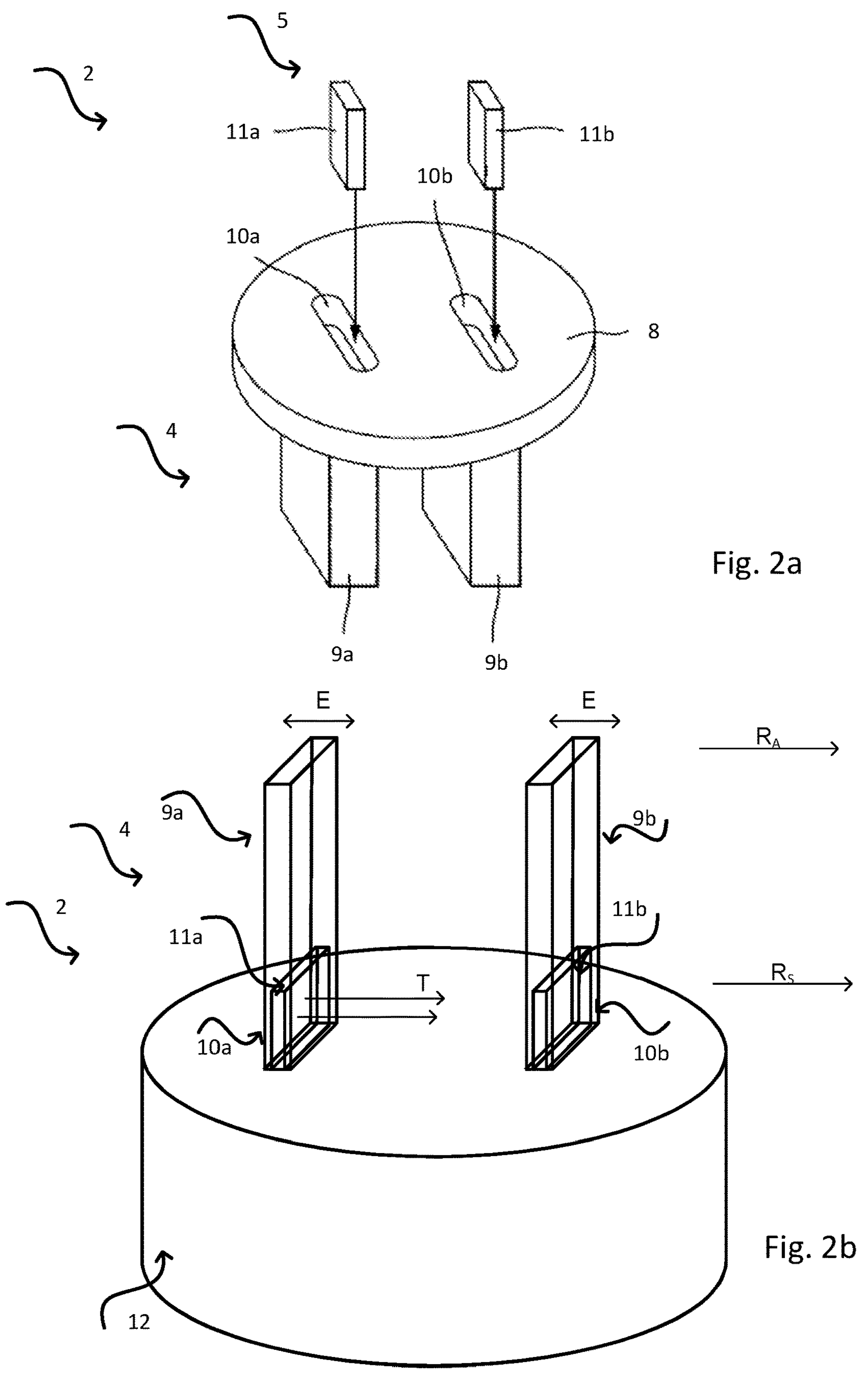
FIG. 2 shows different possible embodiments for vibronic sensors according to the state of the art, in the case of which piezoelectric elements are arranged within the oscillatory elements.

FIG. 2 shows, by way of example, an assortment of sensor units 2 of vibronic sensors 1, in the case of which the piezoelectric elements 5 are arranged in an internal volume of the oscillatable unit. The mechanically oscillatable unit 4 shown in FIG. 2*a* comprises, mounted on a base 8, two oscillatory elements 9*a*,9*b*, which are also referred to as the tines of a fork. Optionally, paddles (not shown) can be formed on the ends of the two oscillatory elements 9*a*,9*b*. Introduced into each of the two oscillatory elements 9*a*,9*b* are, especially pocket-like, hollow spaces 10*a*, 10*b*, in which, in each case, at least one piezoelectric element 11*a*, 11*b* of the exciting/receiving unit 5 is arranged. Preferably, the piezoelectric elements 11*a* and 11*b* are potted within the hollow spaces 10*a* and 10*b*. The hollow spaces 10*a*, 10*b* can, in such case, be so formed that the two piezoelectric elements 11*a*, 11*b* are located completely or partially in the region of the two oscillatory elements 9*a*, 9*b*. Such an arrangement as well as other similar arrangements are described at length in DE102012100728A1.

Another example of a possible embodiment of a sensor unit 2 is shown in FIG. 2*b*. The mechanically oscillatable unit 4 has two mutually parallel, here bar-shaped, oscillatory elements 9*a*, 9*b* mounted on a disc shaped element 12. The oscillatory elements 9*a*, 9*b* are excitable to execute mechanical oscillations separately from one another and their oscillations can likewise be received and evaluated separately from one another. Each of the oscillatory elements 9*a* and 9*b* has a hollow space 10*a* and 10*b*, in which is arranged in the region facing the disc shaped element 12, in each case, at least one piezoelectric element 11*a* and 11*b*. Regarding the embodiment of FIG. 2*b*, reference is made to DE102017130527A1.

As shown schematically in FIG. 2*b*, the sensor unit 2 is, on the one hand, supplied with an excitation signal E, in such a manner that the oscillatable unit 4 is excited to execute mechanical oscillations. The oscillations are produced, in such case, by means of the two piezoelectric elements 11*a* and 11*b*. The two piezoelectric elements can be supplied with the same excitation signal E, but also a supplying of the first oscillatory element 11*a* with a first excitation signal $E_1$ and the second oscillatory element 11*b* with a second excitation signal $E_2$ is possible. Likewise, a first received signal $R_E$ can be received based on the mechanical oscillations, or separate received signals $R_{E1}$, $R_{E2}$ can be received, one from oscillatory element 9*a* and one from oscillatory element 9*b*.

Moreover, additionally, for example, emanating from the first piezoelectric element 11*a*, a transmitted signal T can be transmitted, which is received by the second piezoelectric element 11*b* in the form of a second received signal $R_T$. Since the two piezoelectric elements 11*a* and 11*b* are arranged at least in the region of the oscillatory elements 9*a* and 9*b*, the transmitted signal T passes through the medium M and is correspondingly influenced by the properties of the medium M, when the sensor unit 2 is in contact with the medium M. Likewise, it is, however, an option that the transmitted signal T is transmitted from the first piezoelectric element 11*a* in the region of the first oscillatory element 9*a* and is reflected on the second oscillatory element 9*b*. In such case, the second received signal $R_T$ is received by the first piezoelectric element 11*a*. The transmitted signal T passes, in such case, two times through the medium M.

Besides these two illustrated embodiments of an apparatus 1 of the invention, numerous other variants are possible, which likewise fall within the scope of the invention. For example, it is possible for the embodiments of FIGS. 2*a* and 2*b* to use only one piezoelectric element 11*a*,11*b*, which is arranged in at least one of the two oscillatory elements 9*a*, 9*b*. In such case, piezoelectric element 11*a* serves for producing the excitation signal, and the transmitted signal T, as well as for receiving the first received signal $R_E$ and the second received signal $R_T$. Then, the transmitted signal T is transmitted from the first piezoelectric element 11*a* in the region of the first oscillatory element 9*a* and reflected on the second oscillatory element 9*b*, so that also the second received signal $R_T$ is received by the first piezoelectric element 11*a*. The transmitted signal T passes, in such case, through the medium M two times, this resulting in a doubling of a travel time T of the transmitted signal T.

Another possibility is shown, by way of example, in FIG. 2*c*. In this case, a third piezoelectric element 11*c* is provided in the region of the diaphragm 12. The third piezoelectric element 11*c* serves for producing the excitation signal E and for receiving the first received signal $R_E$; the first piezoelectric element 11*a* and second piezoelectric element 11*b* serve for producing the transmitted signal T, and for receiving the second received signal $R_T$. Alternatively, it is, for example, possible to produce the excitation signal E and the transmitted signal T as well as to receive the second received signal $R_T$ all with the first piezoelectric element 11*a* and/or second piezoelectric element 11*b*, wherein the third piezoelectric element 11*c* serves for receiving the first received signal $R_E$.

Likewise it is possible to produce the transmitted signal T with the first 11*a* and/or second piezoelectric element 11*b* and the excitation signal E with the third piezoelectric element 11*c* and to receive the first received signal $R_E$ and/or second received signal $R_T$ with the first 11*a* and/or second piezoelectric element 11*b*. Also in the case of FIG. 2*c*, it is for other embodiments possible to omit the first piezoelectric element 11*a* or the second piezoelectric element 11*b*.

Another possible embodiment of the apparatus 1 is shown in FIG. 2*d*. The apparatus includes, starting from the embodiment of FIG. 2*b*, a third oscillatory element 9*c* and a fourth oscillatory element 9*d*. These do not, however, serve for oscillation production. Rather, a third piezoelectric element 11*c* and fourth piezoelectric element 11*d* are arranged respectively in the additional elements 9*c*, 9*d*. In such case, the vibronic measuring is performed by means of the first two piezoelectric elements 11*a*, 11*b* and the ultrasonic measuring by means of the other two piezoelectric elements 11*c*,11*d*. Also in such case, for each measuring principle, one piezoelectric element, e.g. 11*b* and 11*d*, can be omitted. For reasons of symmetry, it is, however, advantageous, always to use two additional oscillatory elements 9*c*, 9*d*.

Figure 3:
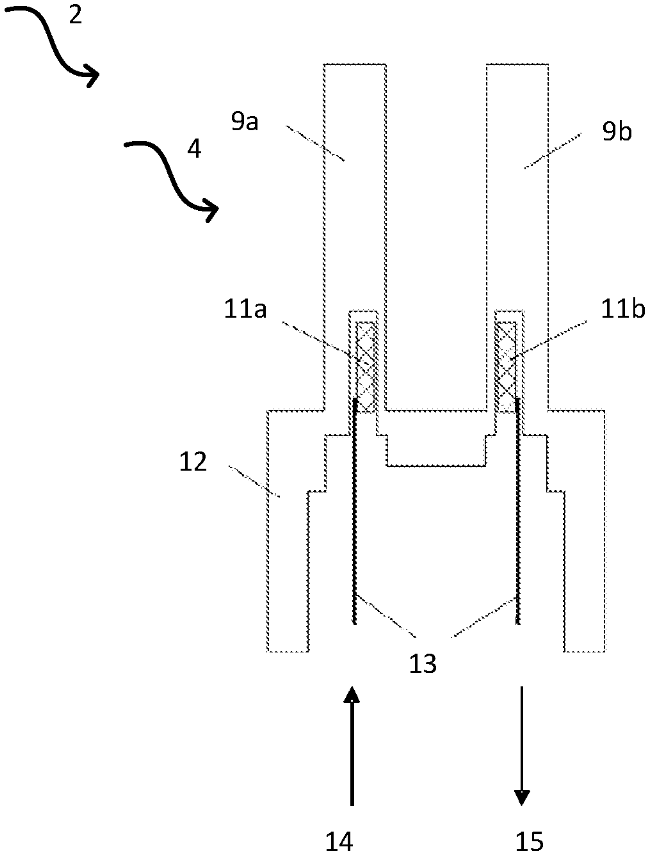
FIG. 3 shows a preferred embodiment of the method of the present disclosure.

According to the invention, information concerning state of the sensor unit 2 is generated based on the transmitted signal T. Preferably, the sensor unit 2 is embodied in such a manner that the at least one piezoelectric element 11*a* is arranged, at least partially, in an internal volume of the oscillatable unit 4, especially, at least partially, within an oscillatory tine 9*a* of the oscillatable unit 4. Such a sensor unit 2 is shown schematically in FIG. 3 for the case, in which two piezoelectric elements 11*a* and 11*b* are used. The piezoelectric elements 11*a*, 11*b* are arranged within the oscillatory elements 9*a*, 9*b* mutually facing one another and located in a diaphragm 12 facing end region of the mechanically oscillatable unit 4. The state monitoring occurs by means of a signal generator 14 connected via an electrical supply line 13 and an amplitude detector 15 connected via an electrical supply line connected, respectively, with the two piezoelectric elements 11*a*, 11*b*. In other embodiments, in given cases, other arrangements of the signal generator 14 and amplitude detector 15 can be advantageously applied. By means of such an arrangement, a state monitoring of the oscillatable unit 4 can occur in especially easy manner by means of an amplitude detection via the amplitude detector 15 and, for example, a covering of the oscillatable unit 4 with medium M can be detected especially easily and reliably. This improves the accuracy of measurement and safety of vibronic limit level sensors 1.

The invention claimed is:

1. A method for determining and/or monitoring a predeterminable fill level of a medium in a containment using a sensor having a sensor unit with a mechanically oscillatable unit in the form of an oscillatory fork and at least one piezoelectric element, the method comprising:

exciting the sensor unit with an excitation signal such that mechanical oscillations are executed;

receiving the mechanical oscillations of the sensor unit and converting the received mechanical oscillations into a first received signal;

transmitting an ultrasonic signal from the sensor unit and receiving the ultrasonic signal as a second received signal by the sensor unit;

ascertaining a frequency of the first received signal;

ascertaining an amplitude of the second received signal;

determining the predeterminable fill level of the medium has been reached when the frequency of the first received signal subceeds a predeterminable frequency limit and an amplitude of the second received signal does not subceed a predeterminable amplitude limit; and determining that a blockage in a region of the sensor unit is present when the frequency of the first received signal subceeds the predeterminable frequency limit and the amplitude of the second received signal subceeds the predeterminable amplitude limit.

2. The method as claimed in claim 1, further comprising:

interrupting the excitation signal before transmitting the ultrasonic signal, wherein the excitation signal and the transmitted signal are periodically and alternately produced.

3. The method as claimed in claim 2, wherein the transmitted signal is produced at predeterminable points in time.

4. A vibronic sensor, comprising:

a sensor unit, including:

a mechanically oscillatable unit in the form of an oscillatory fork; and at least one piezoelectric element; and a sensor electronics embodied to:

excite the sensor unit with an excitation signal such that mechanical oscillations are executed;

receive the mechanical oscillations of the sensor unit and convert the received mechanical oscillations into a first received signal;

transmit an ultrasonic signal from the sensor unit and receive the ultrasonic signal as a second received signal by the sensor unit;

ascertain a frequency of the first received signal;

ascertain an amplitude of the second received signal;

determine a predeterminable fill level of the medium has been reached when the frequency of the first received signal subceeds a predeterminable frequency limit and an amplitude of the second received signal does not subceed a predeterminable amplitude limit; and determine that a blockage in a region of the sensor unit is present when the frequency of the first received signal subceeds the predeterminable frequency limit and the amplitude of the second received signal subceeds the predeterminable amplitude limit.

* * * * *